United States Patent [19]

Howell

[11] Patent Number: 4,635,751

[45] Date of Patent: Jan. 13, 1987

[54] SILENCER

[76] Inventor: John S. Howell, 2/13 Willow Place, Port Macquarie, N.S.W. 2444, Australia

[21] Appl. No.: 765,327

[22] PCT Filed: Nov. 9, 1984

[86] PCT No.: PCT/AU84/00232

§ 371 Date: Jul. 12, 1985

§ 102(e) Date: Jul. 12, 1985

[87] PCT Pub. No.: WO85/02241

PCT Pub. Date: May 23, 1985

[30] Foreign Application Priority Data

Nov. 17, 1983 [AU] Australia .............................. PG2429

[51] Int. Cl.$^4$ ............................................. E03D 9/14
[52] U.S. Cl. ..................................... 181/234; 4/300.3; 4/661; 138/31; 138/41; 138/46
[58] Field of Search ................... 181/233, 234; 138/26, 138/31, 41–43, 46; 4/300.3, 329, 661

[56] References Cited

U.S. PATENT DOCUMENTS

| | | | |
|---|---|---|---|
| 2,214,287 | 9/1940 | Sloan et al. | 181/234 |
| 2,231,959 | 2/1941 | Sloan | 181/233 X |
| 2,258,469 | 10/1941 | Podolsky | 181/233 |
| 3,285,277 | 11/1966 | Goldtrap | 181/234 X |
| 3,995,664 | 12/1976 | Nelson | 138/43 |

Primary Examiner—Benjamin R. Fuller

[57] ABSTRACT

A silencer attached to a toilet cistern float valve or the like includes damping elements disposed between two cavities with ports communicating between the two cavities. A cylinder beneath a lower one of the two cavities communicates therewith through an apertured partition wall while the lower cavity includes a water outlet disposed at a level above that of the ports leading to the lower cavity to eliminate any air gap during refilling of the cistern. After refilling, water in the lower cavity drains through the apertured partition wall into the cylinder, the latter of which includes a bottom opening providing a siphon-breaking air gap.

6 Claims, 7 Drawing Figures

SILENCER

This invention relates to plumbing and more specifically provides a silencing device adapted to reduce noise caused for example, by fluid passing at relatively high pressures through restricted orifices.

One example of such noise is with cisterns for domestic toilets which after flushing are normally refilled through a float valve from a source of mains pressure of about 35 to 70 p.s.i. Such float valves typically comprises an arm assembly which has a float at one end and is pivoted to operate a slideable piston that progressively cuts off the incoming flow through an entry orifice as the level of water in the cistern rises. In order for the valve to close against high pressures however, the orifice has to be of relatively small cross-section and this naturally increases the refilling time and also has been found to generate the excessive noise observed in such systems.

It is therefore an object of this invention to ameliorate the aforementioned problems and accordingly this invention in one broad aspect discloses a silencing device for incorporation into a pressurised fluid circuit comprising a housing having an inlet and an outlet in communication through a chamber defined therein, and a fluid flow restriction or damping means disposed within said housing.

The presently preferred embodiments of this invention are shown in the attached drawings in which:

FIGS. 1 and 1A shown one form of silencer adapted for fitting to the inlet side of a toilet cistern float valve;

Figure 1:
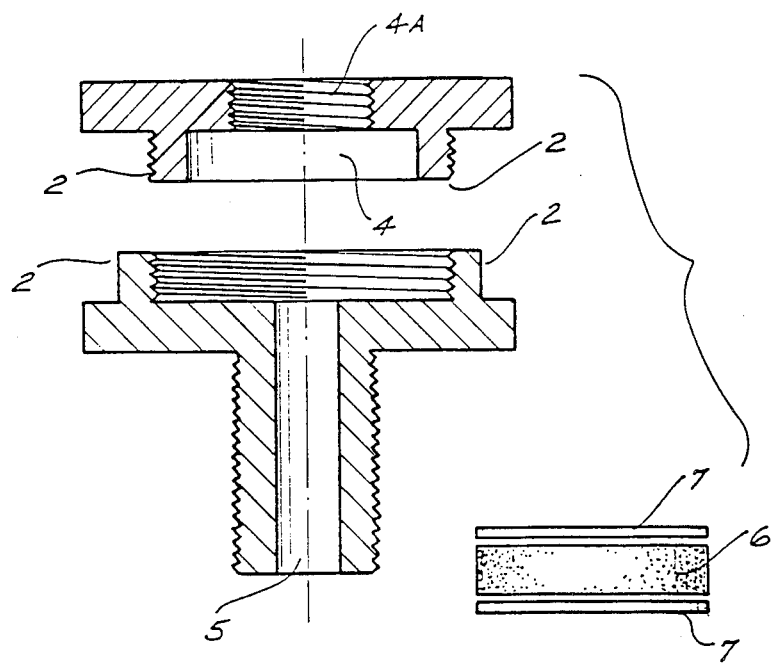
Figure 1A:
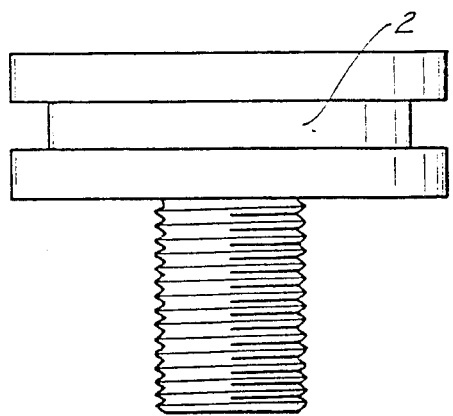

Referring first to FIGS. 1 and 1A the device comprises a two piece housing which is adapted for assembly by means of mating threaded flanges 2 to define therein a chamber 4 through which communicate an inlet 4A and outlet 5. The inlet and outlet ports may also be threaded to facilitate connection with the existing piping of a toilet cistern float valve.

The fluid flow restriction or damping means may in this case comprise a felt or other water permeable pad 6 sandwiched between perforated plastic discs 7. The pad and discs are dimensioned to fit within the circular walls of the chamber 4 sufficiently closely to require the water flow to pass substantially through the porous material rather than around it. At the same time however enough clearance adjacent the peripheral edge of the upper disc 7 should be provided to enable it to deform or deflect clear on the inlet under an applied water pressure to allow fluid flow. Upon cessation of flow the natural resilience of the pad would bias the disc upwardly across the inlet to operate in the manner of a check valve against reverse flow through the device.

Figure 2:
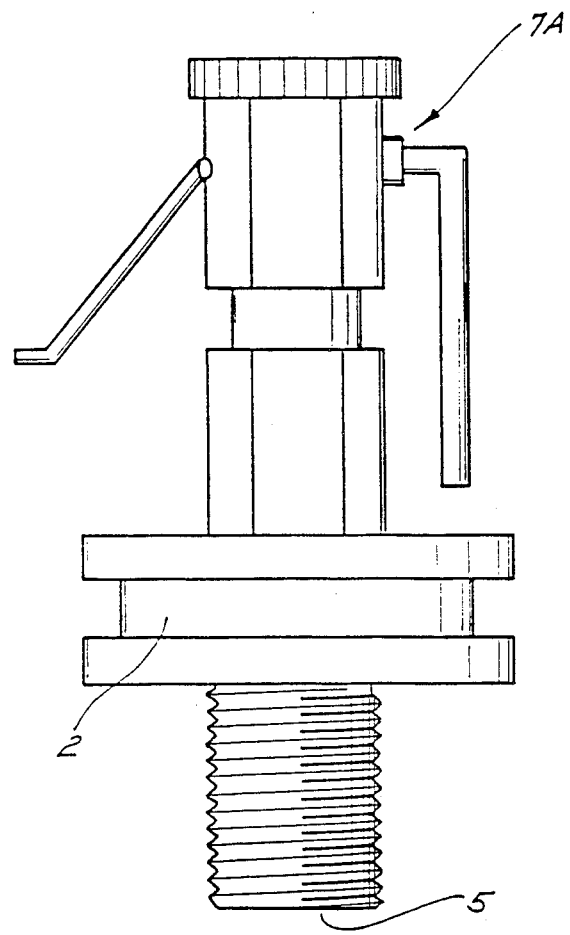
FIG. 2 shows the silencer of FIG. 1 fitted to the float valve.

This particular example of the invention is adapted to fit on the inlet side of a cistern float valve 7A as shown schematically in FIG. 2. When so installed it has been found to provide a substantial reduction in the level of noise emanating from the valve during filling without causing any significant reduction in the flow rate.

Although the dimensions of the housing may vary according to application and/or design preference, by way of non-limiting example, the values shown in FIGS. 1 and 1A may be found suitable for typical installations with water pressures of the order of 50 p.s.i.

Figure 3:
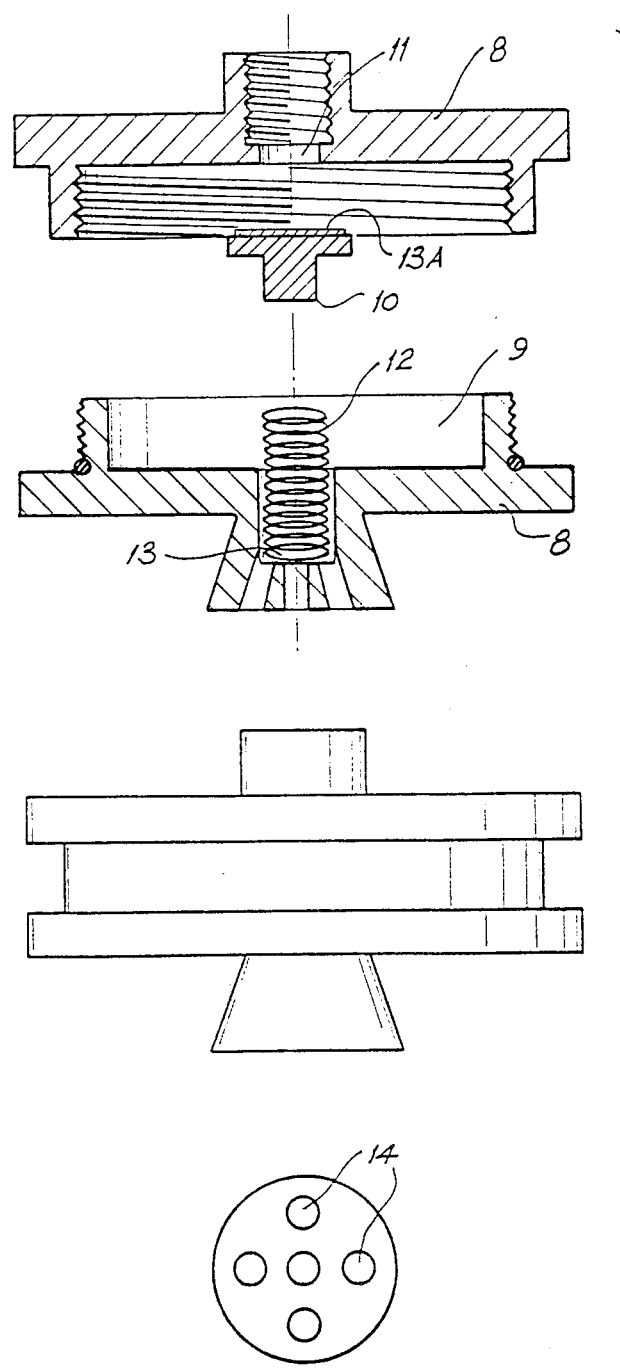
FIG. 3 shows a second form of silencer according to this invention which is adapted for attachment to the outlet side of a toilet cistern float valve.
Figure 4:
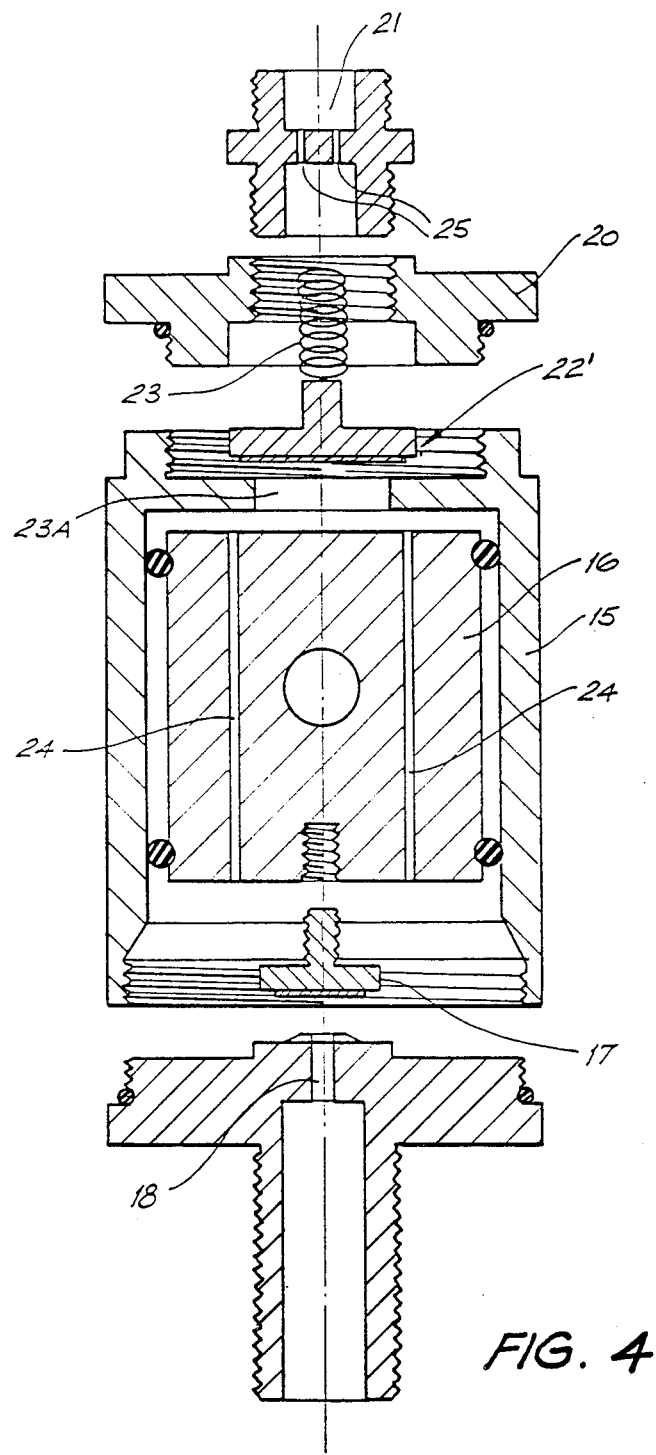
FIG. 4 shows an exploded schematic view of a further form of the invention comprising a combination silencer and toilet cistern float valve.

A further embodiment of this invention is shown in FIG. 3. In this case the housing again comprises two components 8 adapted to threadably engage to define a chamber 9 therein. The flow restriction or damping means with this example however consists of a stem 10 which is biased upwardly to seat across the inlet port 11 by a coil spring 12 seated within a central recess 13 in the bottom component preferably the upper face or head of this stem is covered with a suitable rubber or plastic layer 13A to enhance its sealing effect over the inlet. The outlet may consist of a plurality of holes 14 extending out from the bottom of the recess 13. This particular embodiment of the invention is suitable for attachment to the existing outlet of most conventional toilet cistern float valves and when so installed also effects a substantial noise reduction during refilling. Further it has also been found in some cases to decrease the filling time of the cistern by enhancing the flow rate of water through the float valve right up to the cut off point. While the shape and particular dimensions of the example shown in FIG. 3 may similarly vary according to application and design preference it has been found that acceptable noise reduction is obtained by using the following combinations of spring tension and outlet holes 14:

3 outlet holes of 2 mm each—spring force 5.69 kilograms 9 outlet holes of 1½ mm each—spring force of 6.53 kilograms 25 holes of 1 mm each—spring force of 4.69 kilograms A third embodiment of the invention is shown on FIG. 4 in the form of a combination silencer and cistern float valve. In this case the device may consist of a central housing 15 within which is mounted a valve slide member 16 connected to the float arm (not shown). The slide member 16 threadably engages a valve seat 17 so that lowering of the slide with rising water level in the cistern causes the seat 17 to be biased against the inlet orifice 18 to progressively block off the water inlet.

The upper end of the housing 15 threadably engages the silencer casing 20 and outlet nozzle 21 which when assembled defines an interior chamber including a stem-containing plug member 22', that is biased by a coil spring 23 against an opening 23A in the housing 15. In operation with the valve open the supply water would pass into the device through the inlet orifice 18, and up through water transfer ports 24 in the valve slide. The pressure would then force open the plug member 22' and the water would pass through the silencer and out the exit ports 25 of the outlet nozzle 21 into the cistern.

Figure 5:
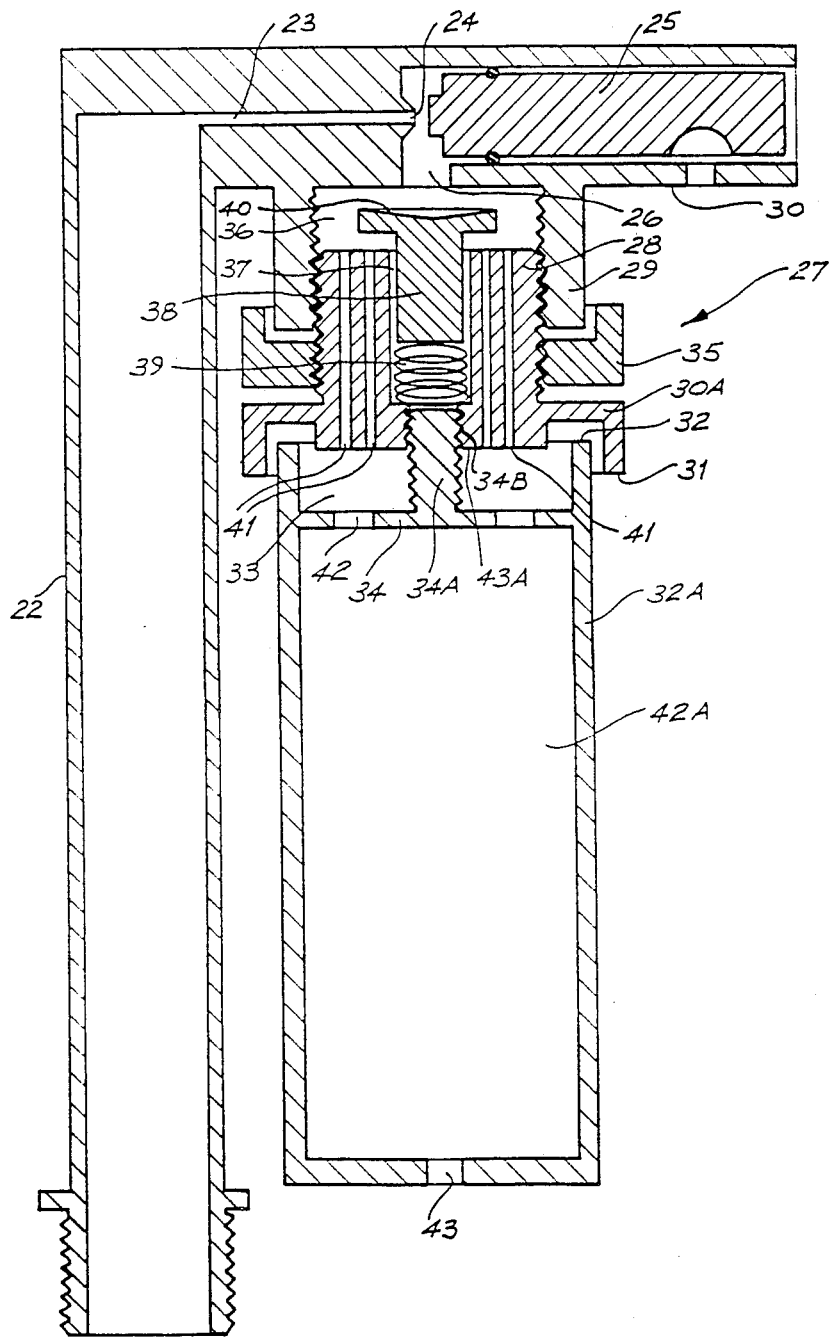
FIG. 5 shows a prospective view of a fourth embodiment of the invention which comprises a combination silencer and float valve for a toilet cistern.
Figure 6:
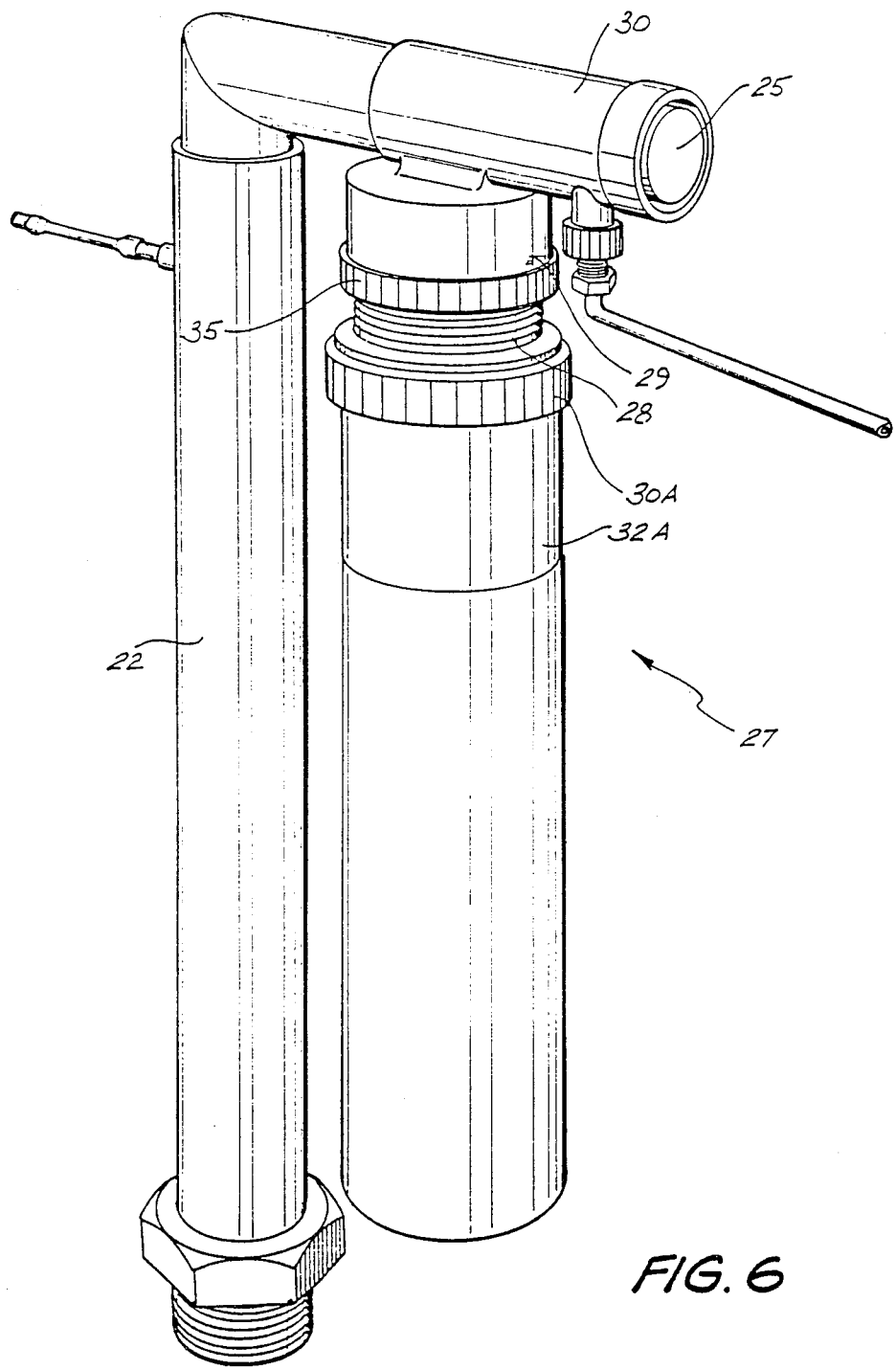
FIG. 6 shows a cross-sectional view of the silencer and float valve of FIG. 5.

A fourth embodiment of the invention is shown in cross-section in FIG. 5. The inlet pipe which connects with the mains pressure water supply and normally extends up from the bottom of the cistern is designated as 22. The upper end of this pipe leads into a narrow orifice 23 which terminates in a valve seat 24. The water flow through this orifice is regulated by a valve slide 25 which in turn is operated by a float arm (not shown). The arrangement is such that as the water in the cistern refills to a predetermined level the slide 25 is forced against the seat 24 to prevent further inflow of water. Any drop in the cistern level has the opposite effect of withdrawing the slide 25 to the right and thus opening the orifice to replenish the cistern through outlet 26.

The silencer is indicated generally by the numeral 27. It comprises a threaded plug 28 which engages within a boss or collar 29 extending down from the slide valve housing 30. The lower end of this plug includes a peripheral skirt or flange 30A which extends downwardly towards its outer edge 31 so as to overlap the upper edge 32 of a cylinder 32A and form a cavity 33 above partition 34 and adjacent the top of the cylinder. This cylinder is mounted to the underside of the silencer by means of a threaded spindle 34A which extends up from partition wall 34 and screws into a corresponding bore 34B in the underside of the plug 28. The plug is secured in place within the boss 29 by a lock nut 35 so as to provide a chamber or internal cavity 36 between the top of the plug 28 and the outlet 26. The relative size of this chamber may be varied by loosening the lock nut and rotating the plug to obtain maximum noise reduction for a given mains pressure. The lock nut as shown may also be stepped so that by reversing it the silencer can be adjusted to accommodate excessively high or low pressures.

Although not shown in the drawings other means of securing the plug 28 within the collar 29 may be used such as for example a circlip.

The plug 28 has a central bore 37 within which a valve stem 38 is disposed. This stem is slidable within the bore and a coil compression spring 39 serves to bias it against the valve outlet 26. The tension of this spring however is selected so that the incoming pressure is sufficient to displace the head 40 away from outlet 26 to allow water to flow through chamber 36 and ports 41 into the cavity 33. As an alternative to the coil spring shown an elastic diaphram may be found preferable in some installations. While the partition wall 34 has apertures 42 to allow some water to subsequently enter the main body of the cylinder 42A and thence out the bottom 43 the cross-sectional area of these apertures relative to that of the ports is chosen so that the incoming water on replenishing of the cistern quickly fills the cavity 33 and spills over the outside of the cylinder between the upper edge 32 and flange 30A. It is important that the upper edge 32 of the cylinder terminates above the lower face 43A of the plug so that any air gap is eliminated which would otherwise generate noise through splashing and turbulence.

After the refilling is completed and the incoming flow ceases, any excess water in the cylinder flows out hole 43 to reduce the level within to that of the cistern and provide an air gap below the plug face 43A of preferably 20 mm or more. Such an air gap has been found necessary to prevent any back syphoning into the mains water supply during mains pressure failures.

It will thus be appreciated that this invention at least in the form of the various examples disclosed provides a novel and unique means of substantially reducing if not eliminating noise generated by the passage of high pressure water through the float valves of toilet cisterns. Clearly however the particular shape and configuration of the various embodiments described may be modified in a wide variety of ways apparent to a man skilled in the art. For example the silencer housing may be constructed of any suitable material such as metal or plastic and its design may be changed according to application as can the number and size of exit ports and apertures in the cylinder referred to in the fourth embodiment. Further the valve stem may or may not be spring biased and can be of various shapes including concave, convex, or flat, etc.

The claims defining the invention are as follows:

1. A silencer for attachment to a toilet cistern float valve or the like comprising a housing having an inlet and an outlet respectively communicating with an intermediate chamber defined therein, damping means disposed within said chamber for reducing flow noise generated in the valve, a cylinder mounted adjacent said outlet and having an upper edge disposed above the level of said outlet and defining a space therearound, said cylinder having a bottom opening, and a partition disposed across the interior of said cylinder and defining a cavity directly below said outlet, said partition provided with an aperture, whereby during refilling of the cistern water fills the cavity to a level above said outlet to thereby eliminate any air gap and subsequently spills through said space over said upper edge and down the outside of the cylinder and after cessation of flow through the valve the water in said cavity drains away through said aperture in said partition and said cylinder bottom opening to provide a siphon-breaking air gap below said outlet.

2. The silencer as claimed in claim 1 including, adjustment means operable to vary the size of said chamber in accordance with the pressure of water entering the valve to obtain maximum noise reduction.

3. The silencer as claimed in claim 2 wherein said outlet comprises a plurality of holes extending from said housing.

4. The silencer as claimed in claim 3 wherein said damping means includes a dish shaped face disposed to intercept the flow of water as it enters said chamber from said inlet.

5. The silencer as claimed in claim 4 wherein said dish shaped face is secured to a stem slidably mounted within said chamber.

6. The silencer as claimed in claim 1 in combination with said toilet cistern float valve wherein at least part of said housing of said silencer is formed as one piece with said float valve.

* * * * *